Dec. 22, 1931.  G. W. PAULSON  1,837,289
STEERING GEAR
Filed Feb. 25, 1930  2 Sheets-Sheet 1
Fig. 1
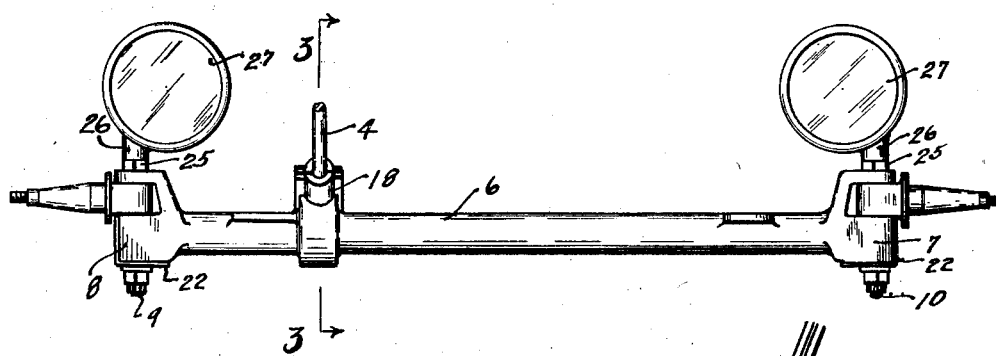
Fig. 6
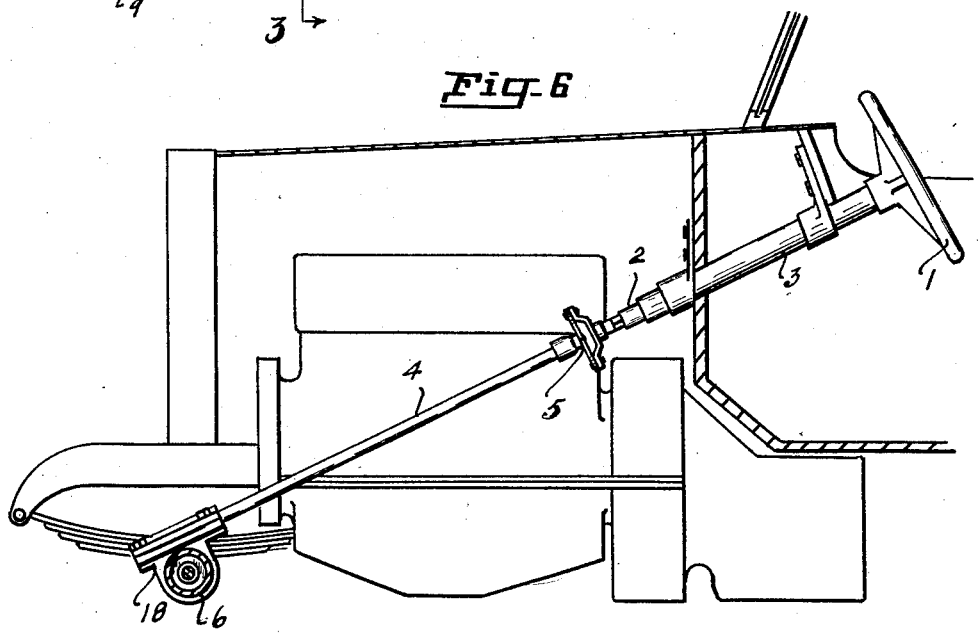
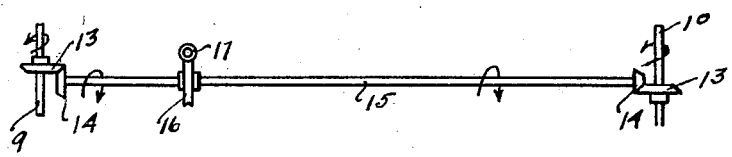
Fig. 5
George W. Paulson
INVENTOR
BY
ATTORNEY

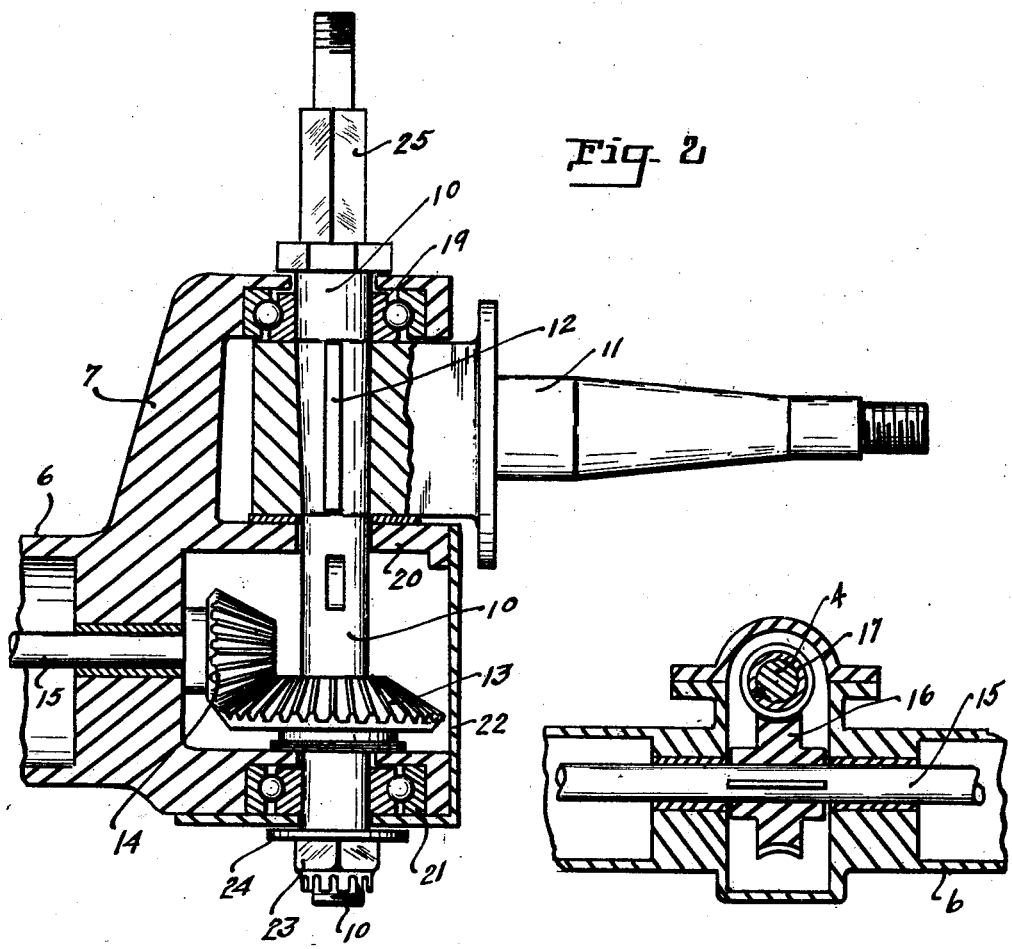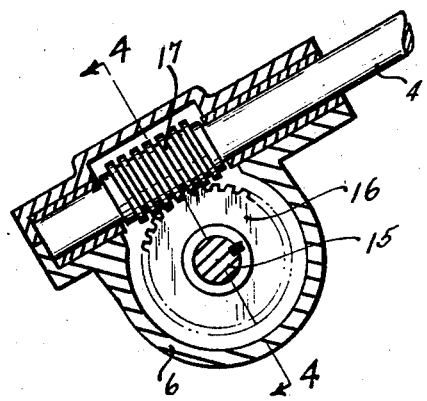

Patented Dec. 22, 1931

1,837,289

UNITED STATES PATENT OFFICE

GEORGE W. PAULSON, OF PORTLAND, OREGON, ASSIGNOR OF ONE-HALF TO JOHN K. PETERSON, OF SKAMOKAWA, WASHINGTON, AND FIVE ONE-HUNDREDTHS TO JOHN R. WEBER, ONE ONE-HUNDREDTH TO FRANK R. IWATTA, ONE ONE-HUNDREDTH TO NICK WONG, ONE ONE-HUNDREDTH TO H. H. STAUB, ONE ONE-HUNDREDTH TO JAMES P. ALTISER, ONE ONE-HUNDREDTH TO FRANCIS M. GEORGE, ONE ONE-HUNDREDTH TO GEORGE GIDDINGS, AND THREE ONE-HUNDREDTHS TO EARL M. GRAVES, ALL OF PORTLAND, OREGON

STEERING GEAR

Application filed February 25, 1930. Serial No. 431,272.

My invention is primarily intended for use as a steering device on automotive equipment such as automobiles, trucks, tractors and the like.

The invention consists primarily of a steering column disposed upon the dash of an automotive vehicle terminating on its lower end in a shaft having a worm disposed thereupon and having a flexible connection disposed between the steering column and the shaft upon which the worm is disposed. An axle is provided having vertically disposed spindle bolts disposed therein. Bevel gears are disposed upon the spindle bolts. The bevel gears are adapted to coact with bevel pinions disposed upon a shaft running parallelly within the axle and preferably disposed therein so that each of the spindle bolts to which the stub shafts of the axle are disposed may be rotated simultaneously and in equal amount. Means are disposed upon the vertically disposed spindle bolts for taking up the wear relative to the axle head.

The primary object of my invention is to provide simple and efficient steering means, that are protected and that are disposed within the axle, so that the steering elements may not become damaged in the normal operation of the vehicle.

A further object of my invention resides in a simple construction over that now commonly used.

A still further object of my invention resides in a fully protected steering construction so that the hazard of damage to the steering elements will be reduced to a minimum.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a side view of the assembled axle and illustrating the shaft associated therewith that is adapted for being driven by the steering column of the vehicle.

Fig. 2 is a fragmentary, sectional, side view of the axle head and illustrating the stub shaft disposed therein and adapted for being rotated by a spindle bolt vertically disposed within the axle head.

Fig. 3 is a sectional, end view of the axle and shaft and illustrating the worm and the worm wheel disposed within the housing disposed about the axle and shaft, the same being taken on line 3—3 of Fig. 1 looking in the direction indicated.

Fig. 4 is a sectional, end view of the mechanism illustrated in Fig. 3, the same being taken on line 4—4 of Fig. 3 looking in the direction indicated.

Fig. 5 is a diagrammatical layout of each of the spindle bolts disposed within the axle heads, illustrating the driving shaft disposed longitudinally of the axle and illustrating the worm wheel disposed upon the shaft and the coacting worm associated therewith.

Fig. 6 is a sectional, side view of an automotive vehicle illustrating one of my new and improved devices in place upon the automotive vehicle.

Like reference characters refer to like parts throughout the several views.

1 is the steering wheel and 2 is the steering column to the upper end of which the steering wheel is removably attached. 3 is the steering column post for maintaining the steering column in position. Disposed at the lower end of the steering column is the steering shaft 4. Between the steering column 2 and the steering shaft 4 is a flexible connection 5 which connects the two. The axle structure is shown at 6. Axle heads 7 and 8 are disposed at oppositely disposed ends of the axle. Spindle bolts 9 and 10 are vertically disposed within the axle heads. A stub axle 11 is disposed upon each of the spindle bolts 9 and 10 and are removably secured thereto by any suitable key 12. A bevel gear 13 is disposed upon each of the spindle bolts 9 and 10 and a pinion 14 coacts with each of the bevel gears. A shaft 15 runs longitudinally of the axle 6 and the bevel pinions 14 are disposed upon the oppositely disposed ends of the shaft 15. A worm wheel 16 is also disposed upon the shaft 15 and a worm 17 coacts therewith. The worm 17 is mounted upon the steering shaft 4. The worm 17 and the worm wheel 16 are mounted within any suitable housing 18 that is disposed about the axle 6. Each axle head is preferably made as illustrated in Fig. 2 wherein a thrust bearing 19 is disposed within the upper portion of the axle head. The axle head is divided into sections by a diaphragm 20 disposed therebetween with the spindle bolts 9 and 10 passing vertically through the axle head. The bevel gear 13 is disposed upon the spindle bolt in the lower compartment of the axle head. A second roller bearing 21 is disposed upon the lower side of the axle head and through which the spindle bolts pass. A closure plate 22 is secured to the axle head by the spindle bolt passing therethrough and the same is held in place by the nut 23. A washer 24 is disposed between the nut 23 and the closure 22. Studs 25 are disengagedly secured to the upper end of the spindle bolts to which brackets 26 are disposed and upon which the head lights 27 are attached. Thus as the spindle bolts are rotated to steer the motor vehicle the head lights will at all times be disposed in the line of travel of the vehicle.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

In a device of the class described, the combination with a hollow axle having a shaft rotatably disposed longitudinally therethrough, a head disposed at each end of the axle, said heads each comprising a pair of chambers disposed one above the other, a spindle bolt vertically disposed through each of the chambers and outwardly extending from the upper chamber, coacting gears disposed within the lower chamber and associated with the spindle bolt and with the ends of the shaft, and a spindle mounted about the spindle bolt within the upper chamber.

GEORGE W. PAULSON.